US006726760B1

(12) United States Patent
Fisher et al.

(10) Patent No.: US 6,726,760 B1
(45) **Date of Patent: *Apr. 27, 2004**

(54) NON-OZONE DEPLETING CO-SOLVENT COMPOSITIONS AND ADHESIVE PROMOTER COMPOSITIONS BASED THEREON

(75) Inventors: Edward Fisher, Rocky Hill, CT (US); Ju-Chao Liu, deceased, late of West Hartford, CT (US), by Tehyi Lui, legal representative

(73) Assignee: Henkel Corporation, Rocky Hill, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/022,785

(22) Filed: Feb. 12, 1998

Related U.S. Application Data

(62) Division of application No. 08/691,598, filed on Aug. 2, 1996, now Pat. No. 5,749,956.

(51) Int. Cl.[7] .......................... C09D 5/00; C09D 201/04

(52) U.S. Cl. ............. 106/285; 106/287.21; 106/287.25; 106/287.27; 106/287.28; 252/364

(58) Field of Search ............................ 106/285, 287.27, 106/287.28, 287.21, 287.25; 252/364

(56) References Cited

U.S. PATENT DOCUMENTS 3,260,637 A 7/1966 von Bramer
3,466,757 A * 9/1969 Dunn, Jr. ..................... 34/444
3,617,189 A * 11/1971 Wagner et al. ................. 8/192
3,634,273 A * 1/1972 Marsh et al. .................. 252/8
3,649,584 A * 3/1972 Bailey et al. ............... 524/315
3,666,551 A * 5/1972 Bockstie, Jr. ................ 429/18
3,667,898 A * 6/1972 Bergman et al. ............... 8/467
3,766,075 A * 10/1973 Jackson ...................... 510/286
3,826,772 A * 7/1974 Gebhard ..................... 524/236
3,836,474 A * 9/1974 Barton et al. ............... 510/291
4,289,499 A * 9/1981 Clark et al. ................ 73/61.46
4,869,772 A 9/1989 McDonnell et al.
4,942,267 A 7/1990 Roark et al.
5,066,743 A 11/1991 Okamoto et al.
5,079,098 A 1/1992 Liu
5,098,593 A 3/1992 Rowe
5,100,572 A 3/1992 Merchant
5,104,477 A 4/1992 Williams et al.
5,171,902 A 12/1992 Krespan et al.
5,194,170 A 3/1993 Merchant et al.
5,196,137 A 3/1993 Merchant
5,221,493 A 6/1993 Merchant et al.
5,240,641 A 8/1993 Rowe
5,242,502 A 9/1993 Rowe
5,244,507 A 9/1993 Rowe
5,314,562 A 5/1994 McDonnell et al.
5,431,837 A * 7/1995 Matsuhisa et al. .......... 510/408
5,490,894 A * 2/1996 Matsuhisa et al. ............ 134/30
5,610,128 A * 3/1997 Zyhowski et al. .......... 510/288
5,749,956 A * 5/1998 Fisher et al. ........... 106/287.28

FOREIGN PATENT DOCUMENTS

EP 0 465 037 1/1992
JP 212196 * 8/1994
JP 06212196 * 8/1994
WO WO 96/11979 4/1996

OTHER PUBLICATIONS

XP002094949, Jan. 19, 1993, Database WP1, Week, 9435, Derwent Publications Ltd.

National Electronic Packaging and Production Confernece; West 94; Anaheim, California Proceedings; "Performance Fluids For Cirtical Cleaning and Drying Applications", Grenfell, M.W.; Klink, F.W. and Owens, J.G.

"Oxsol® Solvents"; Occidental Chemical Corporation.

* cited by examiner

*Primary Examiner*—Judy M. Reddick
(74) *Attorney, Agent, or Firm*—Hoffmann & Baron, LLP

(57) ABSTRACT

A non-ozone depleting, non-flammable co-solvent composition useful as a carrier for actives such as accelerators, catalysts, initiators, activators and other primer materials for use as adhesive promoter compositions in combination with adhesive compositions. The co-solvent compositions include an azeotropic solution of a halogenated compound and an aliphatic or aromatic hydrocarbon compound.

7 Claims, No Drawings

NON-OZONE DEPLETING CO-SOLVENT COMPOSITIONS AND ADHESIVE PROMOTER COMPOSITIONS BASED THEREON

This application is a divisional of copending application Ser. No. 08/691,598, filed on Aug. 2, 1996 now U.S. Pat. No. 5,749,956.

FIELD OF THE INVENTION

This invention relates to a non-ozone depleting, non-flammable co-solvent composition useful as a carrier for actives such as accelerators, activators, catalysts or other primer materials for use in combination with adhesive compositions. More particularly, the present invention relates to a co-solvent composition comprising a solution of a halogenated compound in combination with an effective amount of one or more aliphatic or aromatic hydrocarbons such as isoparaffins, isooctane, ligroin, hexane, toluene and mixtures thereof.

BACKGROUND OF THE INVENTION

Chlorinated hydrocarbons such as 1,1,1-trichloroethane, other chlorinated solvents and chlorfluoro hydrocarbons (CFC's), such as $C_2F_3Cl_3$, also known commercially under the trademark FREON®, have been used for many years as solvents in numerous applications. These materials have shown to be very useful in the preparation of and as carriers for primer, activator, catalyst and accelerator compositions used in the adhesive field. These accelerators compositions often contain compounds, such as amine-bearing compounds, which require a solvent carrier for proper transport to and penetration of the substrate surface. Additionally, solvents are used to dilute the pure active compound to a useful concentration, usually on the order of about 0.01 to about 2% by weight.

In recent years, the use of chlorinated hydrocarbons, other chlorinated solvents and CFC's has been substantially lessened due to their deleterious effect on the environment. Regulations have been promulgated not only in the United States but in countries throughout the world to accelerate the phase-out of environmentally destructive solvents, and in particular those which are believed to be ozone-depleting substances. In addition to laws designed to prevent the use of these substances, product labeling requirements have also been promulgated to insure notice is given as to those compounds used as alternatives. Finding acceptable alternatives, however, has been an extremely difficult task. For example, in applications such as adhesive accelerator compositions, the solvent must possess high chemical stability, non-flammability, low toxicity, and have a low volatile organic solvent (VOC) content, yet be sufficiently volatile to readily evaporate once applied, depositing the active ingredient, e.g. an amine accelerator, on a substrate. In addition to these requirements, consideration must be given to cost factors which are important for commercial feasibility.

Attempts to find good solvent systems which balance non-ozone depleting and non-flammable characteristics with sufficient volatility to be useful in adhesive applications, have not been entirely successful. Although many materials possess the ability to act as volatile solvents, most have been too flammable or toxic to serve as suitable replacements for conventional ozone-depleting compounds, i.e. chlorinated hydrocarbons or CFC's. For example, materials such as heptane, acetone, methylethyl ketone, isopropanol, and methanol are excellent solvent systems, with good volatility, i.e. low flash point temperatures and high vapor pressures, but are extremely flammable. Other substances such as isoparaffins, and propylene glycol ether are less flammable, but do not exhibit adequate solvent performance properties alone for use in primer or accelerator compositions for adhesive systems.

One particular class of non-ozone depleting substances, which have been used in non-aqueous cleaning applications, are perfluorocarbons (PFC's). These materials are essentially non-toxic, non-flammable and thermally and hydrolitically stable alternatives to CFC's. In fact, the U.S. Environmental Protection Agency (EPA) has exempted PFC's from their VOC list, which indicates that they are non-ozone depleting and essentially non-reactive and non-polluting in the vapor phase. PFC's do, however, have the drawback of having low solvency for polar materials and most hydrocarbons. Thus, perfluorocarbons would not in themselves be expected to be useful as carriers for materials which require a solvent carrier, such as adhesion promoter compositions.

It is apparent, therefore, that a need exists for a solvent system which can carry actives, such as accelerator, activator, initiator, catalyst or primer compounds for adhesives, and which possess the following characteristics: non-ozone depleting, non-flammable, little or no VOC yet sufficient volatility for use as a carrier for active ingredients, low in toxicity and affordable in cost. The present invention is directed to overcoming the solvency deficiencies of perfluorocarbons, as well as addressing the aforementioned requirements for a useful alternative to CFC'S.

SUMMARY OF THE INVENTION

The present invention is directed to non-ozone depleting and non-flammable solvent compositions which include a solution of a halogenated first component selected from the group consisting of perfluorocarbons, dihydropolyfluoroalkanes having from 5 to 7 carbons, trihydropolyfluoroalkanes having 5 to 7 carbons, parachlorobenzotrifluoride, monochlorotoluene, 3,4-dichlorobenzotrifluoride, perchloroethylene, alpha, alpha, alpha-trifluorotoluene and mixtures thereof; and an aliphatic or aromatic hydrocarbon second component having from 6 to 20 carbons. The aliphatic or aromatic hydrocarbon preferably includes isoparaffins, isooctane, ligroin, hexane, toluene and mixtures thereof.

It has been discovered that the aforementioned halogenated first component when combined with the aliphatic or aromatic hydrocarbon second component results in a co-solvent composition which has the above-desired characteristics necessary to serve as replacements for CFC's in adhesive promoter compositions. Additionally, quite unexpectedly the aliphatic or aromatic hydrocarbon when incorporated into an adhesive primer composition significantly improves the bonding strength of cyanoacrylate adhesives on plastic. While the aliphatic or aromatic hydrocarbon component itself may be unacceptable as a commercially viable carrier, when combined with the first co-solvent component, an excellent and safe carrier composition is formed.

For purposes of the present invention, the term "promoter" will be used to include accelerator, activator, initiator, catalyst or adhesion enhancing compounds, as well as other compounds used for initiating, accelerating or otherwise enhancing the polymerization of adhesive compositions.

The inventive co-solvent compositions are non-ozone depleting, non-flammable solvent systems which serve as excellent carriers for the aforementioned promoter components. Thus, for example, an amine-containing accelerator for cyanoacrylate adhesives, may be added to the co-solvent composition to form an accelerator composition. Other promoter compositions for various adhesive systems, such as anaerobic adhesives, olefinic adhesives, epoxy adhesives, and acrylic adhesives, among others, may be formed from the present co-solvent compositions. Such promoter compositions are formed by adding the promoter component to the co-solvent composition in an appropriate amount such that when applied to a substrate surface, sufficient promoter component will be deposited to serve its intended function. The co-solvent compositions of the present invention are azeotropic which correlates with their non-flammable volatility.

The respective amounts of the two co-solvent materials may vary and is only limited by respective amounts which will no longer effectively dissolve actives. In general, the co-solvent compositions include the halogenated first component to be present in amounts of about 40% to about 98% by weight of the co-solvent composition, preferably about 75% to 90% of the composition, and most preferably about 84% to about 88%. The aliphatic or aromatic hydrocarbon second component may be present in amounts of about 2% to about 60% by weight, and preferably about 2% to about 25% and most preferably, about 2% to about 12% of the co-solvent composition.

These co-solvent solutions can be used as carriers or hosts for a variety of active ingredients and guest materials which are dispersible or dissolvable therein. In preferred applications, the active material is an accelerator compound, such as an amine-containing compound, useful for accelerating the cure speed of adhesive compositions, and in particular, cyanoacrylate adhesives. In addition to such an accelerator compound, other materials can be incorporated into the co-solvent solution such as adhesion promoters, stabilizers, viscosity modifiers, odor masking agents, coloring agents, plasticizers and the like, and mixtures of these materials.

In a further aspect, the present invention includes a method of preparing an adhesive promoter composition, which includes the steps of forming a co-solvent composition of halogenated first component and an aliphatic or aromatic hydrocarbon second component, both as defined herein and which is liquid at room temperature and adding to said co-solvent composition a material which promotes the cure and/or enhances the adhesion of an adhesive.

The present invention further provides a method of bonding a non-polar substrate to another substrate, which may be polar or non-polar, which method comprises treating the non-polar substrate with an adhesive promoter composition which includes a co-solvent composition comprising the aforementioned halogenated first component, the aforementioned aliphatic or aromatic hydrocarbon second component and an adhesive promoter component.

DETAILED DESCRIPTION AND PREFERRED EMBODIMENTS

The non-ozone depleting and non-flammable co-solvent compositions of the present invention include a solution of a halogenated first component selected from the group consisting of perfluorocarbons, dihydropolyfluoroalkanes having from 5 to 7 carbons, trihydropolyfluoroalkanes having from 5 to 7 carbons, parachlorobenzotrifluoride, monochlorotoluene, 3,4-dichlorobenzotrifluoride, perchloroethylene, alpha, alpha, alpha-trifluorotoluene, bromochloroethane and mixtures thereof; and an aliphatic or aromatic hydrocarbon dissolvable or readily miscible in said first component and having from 6 to 20 carbons. The aliphatic or aromatic hydrocarbon includes isoparaffins, hexane. isooctane, ligroin, toluene and mixtures thereof, among others.

Isoparaffins are a class of aliphatic or aromatic hydrocarbons characterized by a straight or branched carbon chain. They have the generic formula $C_nH_{2n+2}$ and their physical form varies from gases to waxy solids depending on their molecular weight. In the present invention, those molecular weights which are liquid at room temperature are preferred since they provide a convenient means for combining this material with its co-solvent. Among the known isoparaffinic materials which fit this description are those isoparaffins having from 6 to 20 carbons. These materials are generally available in highly pure form and are odorless. When incorporated into the adhesive primer compositions of the present invention, isoparaffins contribute significantly to increased bond strength on plastic substrates.

Isooctane, also known as 2,2,4-trimethylpentane, is normally used as a solvent and as a motor fuel additive. Ligroin is a saturated fraction of petroleum and is also known as paraffin oil. It is used in paints and varnishes and as a solvent for resins. By themselves, these materials would not be preferred carrier solvents, but when combined in proper proportion as a co-solvent with the halogenated first component their undesirable properties are greatly ameliorated. Thus, certain of the aliphatic or aromatic hydrocarbons useful in the present invention may be highly flammable or otherwise objectionable themselves, but when combined with the halogenated co-solvent component of the present invention, they are suitable for use in accordance with the requirements described herein.

In a preferred embodiment, the halogenated first component comprises a co-mixture of a perfluorocarbon and is selected from the group consisting of parachlorobenzotrifluoride, monochlorotoluene, 3,4-dichlorobenzo-trifluoride, perchloroethylene, alpha, alpha, alpha-trifluorotoluene, and the like and mixtures thereof. Bromochloroethane is also a preferred compound for the first component.

In a typical perfluorocarbon compound such as those disclosed as useful in the halogenated first component, fluorine atoms replace all of the carbon-bound hydrogen atoms on the hydrocarbon parent molecule. The strength of the carbon-fluorine bond allows for a high degree of thermal and chemical stability, resulting in low toxicity and low solvency for polar molecules and most hydrocarbons. For a discussion of these properties, see Grenfell, et al., "Performance Fluids For Critical Cleaning and Drying Applications", presented at the National Electronic Packaging and Production Conference. Thus, while their poor solvency for polar molecules and hydrocarbons makes them good choices for use on plastics, they have not been useful as solvents for adhesive promoter compounds. In fact, due to their inertness, few compounds have been known to dissolve in them. However, it has been discovered that the addition of the aliphatic and aromatic hydrocarbons disclosed herein to the perfluorocarbon greatly improves perfluorocarbon solubility, and results in a newly formed co-solvent composition. This composition can then be used as a carrier for a variety of active ingredients or guest materials. As previously mentioned, perfluorinated compounds have been found to be useful as cleaning fluids for fluorinated greases. Grenfell, et al. attributes this usefulness to the increase in perfluorocarbon solvency capability when azeotropic combinations are formed with specific hydrocarbons. For example, Grenfell, et al. discloses azeotropic mixtures of perfluoro-N-ethyl morpholine (90%) and 2,2,4 trimethylpentane (10%); and azeotropic mixtures of $C_6F_{14}$ (90%) and t-amylmethylether. These mixtures were found to have improved solvency and subsequently improved cleaning ability.

In addition to the perfluorocarbons, certain dihydro- and trihydropolyfluoroalkanes have also been found to be useful. These compounds have from 5 to 7 carbons and their preparation is described in U.S. Pat. No. 5,171,902. Examples of these compounds include $CF_3CHFCHFCF_2CF_3$, $CF_3CH_2CHFCF_2CF_3$, $CF_3CHFCH_2CF_2CF_3$, $CF_3CHFCHFCF_2CF_2CF_3$, $CF_3CH_2CHFCF_2CF_2CF_3$, $CF_3CHFCH_2CF_2CF_2CF_3$, $CF_3CF_2CH_2$, $CHFCF_2CF_3$, $CF_3CF_2CHFCHFCF_2CF_2CF_3$, $CF_3CHFCHFCF_2CF_2CF_2CF_3$, $CF_3CHFCH_2CF_2CF_2CF_2CF_3$, $CF_3CH_2CHFCF_2CF_2CF_2CF_3$, $CF_3CF_2CHFCH_2CF_2CF_2CF_3$, and $CF_3CF_2CH_2CHFCF_2CF_2CF_3$. The preferred compound is 2,3-dihydrodecafluoropentane.

It has been surprisingly discovered that the above-mentioned halogenated first components can be combined with the aforementioned aliphatic or aromatic hydrocarbon second component to form azeotropic solutions which are useful as co-solvent carrier compositions for adhesive promoter components. These combinations due to their azeotropic characteristics, have substantially identical vapor and liquid state makeup at their boiling points, thereby acting as a simple substance. The formation of an azeotrope is important to the low flash-point and non-flammability properties necessary for commercial acceptability. For purposes of the present invention the term "non-flammable" will mean a flash-point of greater than about 200° F. (94° C.), whereby heating is required for the material to catch fire; and the term "flammable" will mean the material is ignitable with a spark rather than by heating, and having a flash point of less than about 100° F. (38° C.). Those compounds which have a flashpoint between 140–200° F. are classified as combustible. These definitions are believed to be in accordance with those set by the U.S. Department of Transportation (DOT).

As previously mentioned, co-solvent combinations of the present invention are non-flammable and non-combustible within the definition given above. This is in contrast to other single materials, such as low molecular weight hydrocarbons, which have been proposed as CFC replacements. These conventional solvent materials, while possessing good solvency and volatility properties, are combustible at temperatures below about 200° F. (94° C.). Other materials which exhibit excellent solvency properties, such as heptane, acetone, methylethyl ketone, methanol, propanol and the like, are highly flammable, requiring only a spark for ignition and therefore cannot be used alone. The use of aliphatic or aromatic hydrocarbons of the present invention in combination with the halogenated, and preferably fluorinated first component, allow for excellent solvency properties, while providing the low flammability properties due to the combined effects of the two co-solvents.

Thus, the present invention balances the properties of good solvency, non-flammability and non-combustibility, without being ozone-depleting. The co-solvent compositions of the present invention can serve as carriers for a variety of materials. Additionally, the present compositions are sufficiently volatile to serve as excellent carriers or solvents for adhesive promoter compositions, and in particular, amine-containing accelerator compositions. This is due to their ability to dissolve basic compounds such as amines and the like, deposit them onto a substrate surface, and quickly evaporate or flash-off, leaving behind the promoter compounds for reaction with a subsequently applied adhesive composition. The azeotropic vapor composition is non-flammable, non-combustible, non-ozone depleting, and non-toxic.

The particular promoter component used will depend for the most part on the adhesive composition to be employed as well as the type of substrate to be bonded. For example, cyanoacrylates, anaerobics, acrylics, epoxies and olefins each have classes of compounds which activate, accelerate or otherwise promote their cure and/or enhance adhesion.

The co-solvent compositions of the present invention have been found to be particularly useful with accelerator compounds for cyanoacrylate adhesive compositions. Cyanoacrylate adhesives are rapid setting materials which have excellent utility in bonding a variety of materials. The polymerization of cyanoacrylate adhesives is catalyzed using basic, i.e., anionic compounds, such as hydroxyl- or amine-containing compounds. In the present invention, the adhesive promoter may be selected from a wide variety of compounds capable of catalyzing or initiating the polymerization or enhancing the affinity for a substrate process. For example, among those compounds to be included are:

a) organic or inorganic substituted and unsubstituted amines such as primary, secondary and tertiary amines and their salts;
b) N-substituted alkanoamines;
c) acylated N-substituted alkanoamines;
d) polyamines, such as diamines;
e) heterocyclic amines such as the diazabicyclo or triazabicyclo compounds disclosed in U.S. Pat. No. 4,869,772.
f) tertiary ammonium carboxylate compounds disclosed in U.S. Pat. No. 5,066,743 and having the formula:

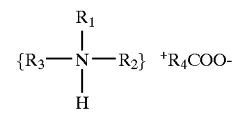

wherein $R_1$, $R_2$, $R_3$ and $R_4$ may each vary independently of each other and may be selected from the group consisting of alkyl, alkenyl, alkynyl, alkylaryl and arylalkyl, and preferably wherein at least one of $R_1$, $R_2$ and $R_3$ is a long chain alkyl moiety having 6–20 carbon atoms and $R_4$ is selected from the group consisting of alkyl and alkenyl;

g) phosphazene compounds including ring or chain polymers containing alternating phosphorus and nitrogen atoms, such as disclosed in U.S. Pat. No. 4,496,686;
h) ethylenediamine compounds such as those disclosed in U.S. Pat. No. 5,314,562 and having the formula:

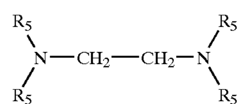

wherein each $R_5$, which may be the same or different, represents hydrogen, an alkyl, alkenyl or alkoxy group having 1 to 8 carbon atoms, an aryl group having 6 to 8 carbon atoms, a nitrogen-, silicon- or silicon-substituted group having 1 to 8 carbon atoms or a heterocyclic group having up to 8 carbon atoms which may be unsubstituted or substituted with hydroxy, ether oxygen or sulphur.

i) quaternary ammonium compounds useful as primers for improving the adhesion, as disclosed in U.S. Pat. No. 5,079,098, having the formula:

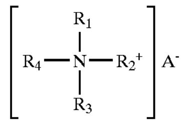

wherein $R_1$, $R_2$, $R_3$ and $R_4$ may each vary independently of the others and are selected from the group consisting of alkyl, hydroxyalkyl, aryl, alkaryl, aralkyl and alkenyl, optionally substituted with heteroatoms; and A- is an anion whose pK, value in deprotonation equilibrium reaction is greater than about 0.

The above-mentioned Pat. Nos. 4,869,772, 5,066,743, 5,079,098, 4,496,686 and 5,314,562 are herein incorporated by reference.

$BF_3$/amine salts have also been found to be useful as adhesive promoter compounds. These $BF_3$/amine complexes may be formed prior to adding to the adhesive primer composition, or formed in situ in the adhesive primer composition. In the latter case, $BF_3$ in etherate or acetic acid medium, is reacted with an amine.

Tertiary amine/$BF_3$ salts are preferred. The addition of specific ratios of amine to $BF_3$, e.g., 5:1, allows for control over fixture time and can prevent or minimize blooming. Blooming is a cosmetic nuisance which results when the adhesive vaporizes and polymerizes on the edge of the bondline. The $BF_3$/amine salt may be employed in effective promoter amounts and when used as a promoter for cyanoacrylate adhesives are effective in amounts of about 0.01 to about 4.0% by weight.

Other useful amines include those disclosed in U.S. Pat. No. 3,260,637, used as accelerators for cyanoacrylates.

Among the preferred class of amines are those selected from the group consisting of tridodecylamine (TDDA), 1,8-diazobicycloundecene (DBU), trihexadecylamine (THDA), hexamethyldisilazane, a tertiary amine/$BF_3$ complex and mixtures thereof. The compounds have been found to be particularly useful in the present invention to form an activator composition for cyanoacrylate adhesive compositions, and the like.

The co-solvent compositions of the present invention can be used with a variety of adhesive systems and are compatible with metallic and non-metallic surfaces. Adhesive promoter systems formed from the co-solvent compositions can be used on numerous types of bonding surfaces, such as steel, plastic, glass and wood. The co-solvent carrier compositions of the present invention provide a more environmentally friendly alternative to conventional solvents and, due to their inertness are compatible with most engineering plastics. In addition to being non-ozone depleting and non-flammable, the co-solvent carrier compositions of the present invention are low in toxicity, fast drying, i.e. quick evaporating, and can be commercially produced in a cost effective manner.

As previously mentioned, the present co-solvent compositions are formed by co-dissolving at least one halogenated first component such as a perfluorocarbon selected from the group consisting of perfluoromethylmorpholine, perfluoroalkanes having from 5 to 8 carbon atoms, dihydropolyfluoroalkanes having 5 to 7 carbons, trihydropolyfluoroalkanes having 5 to 7 carbons, parachlorobenzotrifluoride, monochlorotoluene, 3,4-dichlorobenzotrifluoride, perchloroethylene, alpha, alpha, alpha-trifluorotoluene, bromochloroethane and mixtures thereof.

In one preferred embodiment of the invention, the co-solvent composition includes a combination of: i) a fluorinated compound having the empirical formula $C_5F_{11}NO$, or $C_5H_2F_{10}$ and ii) an isoparaffin which is liquid at room temperature. The fluorinated compound may be present in amounts of about 40 to about 98% by weight, preferably about 84 to about 88% and most preferably, about 75 to about 78% by weight. In general, the isoparaffin or other chosen aliphatic or aromatic hydrocarbon may be present in amounts of about 2.0 to about 60% by weight, preferably about 2 to about 25% by weight, and most preferably about 2 to about 16% by weight. In general, the co-solvent composition is prepared by co-dissolving, for example, about 2.0 to about 60% by weight of the hydrocarbon second component, i.e., isoparaffins $C_{7-20}$, ligroin, hexane, toluene or isooctane and the like in the halogenated first component.

Another embodiment of the invention discloses a non-ozone depleting, non-flammable delivery system wherein the co-solvent serves as a carrier for actives or guest materials which are dispersible or dissolvable therein to form a homogeneous mixture or solution. In preferred applications, the guest material is an amine-containing compound, useful for accelerating the cure speed for adhesive compositions.

Other conventional additives useful in adhesive promoter compositions may be incorporated into the co-solvent compositions. These include, without limitation, stabilizers, viscosity modifiers, odor masking agents, coloring agents, plasticizers, and mixtures thereof.

The co-solvent compositions of the present invention may be formed into adhesive promoter compositions by the addition of an adhesive promoter component. In such a case, the adhesive promoter composition would include the co-solvent composition, and an active such as an adhesive promoter component. The present invention, when combined with an adhesive promoter component and employed as an adhesive promoter composition is intended to be applied to the surface of a metallic or non-metallic surface to be bonded, followed by application of the adhesive thereover, and finally, pressing together of the surfaces. These compositions are generally termed primer compositions. Such compositions are most effective when the surface free-energy of the solvent is close to that of the substrate surface to be adhesively bonded.

The concentration of the promoter component in a particular adhesive promoter composition may be determined by the type of adhesive, particular substrate surface, the promoter selected and the desired function or result. Generally, the promoter component is present in the adhesive promoter composition in amounts which are effective to produce the required cure speed and tensile strength. For example, amounts of from about 0.01% to about 10% by weight of the adhesive promoter composition are useful, with preferred amounts being about 0.01 to about 2%, and most preferably, about 0.25 to about 0.60% by weight. It is preferred to apply the adhesive promoter composition at the lowest effective concentration to decrease cost and increase ease of application, as well as allow the accelerator to be close to the thickness of a monomolecular layer. Typically, one application of the adhesive promoter on one side of the substrate is sufficient, although in certain instances it may be advantageous to coat both substrates. Multiple coatings may be applied where larger bond gaps and thicker adhesive layers are used.

The adhesive promoter composition comprising the co-solvent composition and the promoter component may be applied to the substrate surface to be bonded with the cyanoacrylate, or other adhesive, in any manner that is satisfactory to effect the desired result, e.g., to initiate or accelerate cure or enhance substrate adhesion. For example, spraying, dipping, brushing, swabbing, wiping, roller coating, etc. of the adhesion promoter composition onto one or more of the substrate surfaces prior to application of the adhesive, is preferred.

The thickness of the adhesive promoter composition and adhesive layer may vary widely, depending on the character and composition of the substrate surfaces, the particular adhesive and accelerator to be employed, as well as the end use of the final bonded assembly. With any given set of parameters, acceptable and optimum thicknesses may be determined by tensile shear strength values for particular samples at various primer and adhesive layer thicknesses. The adhesive layer of about “0” to about 5 mils and as great as about 10 mils have been found to be generally satisfactory for many substrates.

The co-solvent compositions of the present invention can be safely applied to a large variety of polymeric substrates, including thermosets and thermoplastics. Examples of thermoplastic materials include, without limitation, polycarbonate (PC), polyphenylene ether alloy, polyphenylene sulfide, polyphenylene oxide, nylon, melamine, polyacetal, polycarbonate, polyesters such as polybutyleneterephthalate (PBT) and polyethyleneterephthalate (PET), acrylic, acrylonitrile butadiene styrene (ABS), cellulose acetate, ethylene vinyl acetate (EVA), ionomer, polyaryl ether, and polyolefins such as polyethlene, polypropylene, polybutylene and polyallomer, polymethylpentane, polystyrene, polysulfone, polyvinyl chloride (PVC), styrene acrylonitrile (SAN), and styrene butadiene; thermosets such as epoxides and phenolics, among others, are also useful. Polytetrafluoroethylene (PTFE) has also been successfully bonded with the co-solvent based systems of the present invention. Composites, such as epoxy glass substrates, may also be used in conjunction with the inventive adhesion promoter and co-solvent compositions.

Other substrates, such as wood, metal, rubber, leather, cloth, paper or ceramics, are of course contemplated, since the co-solvent compositions of the present invention may be customized for a particular application by incorporation of the desired accelerator component.

As previously mentioned, the co-solvent compositions of the present invention are especially useful as carriers for cyanoacrylate adhesive promoter compositions, particularly for enhanced adhesion. Suitable cyanoacrylate adhesives are represented by the general formula:

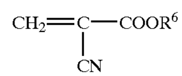

wherein $R^6$ is alkyl, alkenyl, cycloalkyl, aryl, alkoxalkyl, aralkyl, haloalkyl or other suitable group. The lower alkyl alpha-cyanoacrylates are preferred. In particular, these include methyl, ethyl, n-propyl, n-butyl, isobutyl, isopropyl, allyl, cyclohexyl, methoxyethyl, methoxypropyl, cyclohexyl, n-pentyl, allyl, and ethoxyethyl cyanoacrylates.

If a structural or engineering adhesive is to be employed, such as an anaerobic, the co-solvent composition can contain an anaerobic accelerating component which interacts with an initiator present in the adhesive composition to speed the cure. Tertiary alkyl amines, rhodamine and organic hydrazides, alkoxy amines, as well as ferrocene compounds are conventionally used as anaerobic accelerators.

Acrylic adhesives are typically two part systems; the first part containing the monomer and initiator component; and the second part containing the accelerator or curative component, which in the context of the present invention would be carried in the co-solvent composition. Other two part systems, such as epoxy systems, may also employ the co-solvent compositions of the present invention for carrying the curing agent, e.g. amines, anhydrides and the like.

The features and advantages of the present invention will be more clearly understood by reference to the following examples, which are illustrative of certain preferred embodiments but are not to be construed as limiting the scope of invention.

Unless otherwise stated, the examples of the present invention used commercially available alpha-cyanoacrylate adhesive, Loctite® Adhesive 414 to bond the test specimens.

EXAMPLE 1

Co-solvent compositions were prepared using simple mixing procedures in accordance with the present invention. Each of the compositions is set forth in Table I below.

TABLE I

| | Co-Solvent Compositions % Weight | | | | | | | | | | | | | | | | | |
|---|---|---|---|---|---|---|---|---|---|---|---|---|---|---|---|---|---|---|
| | A | B | C | D | E | F | G | H | I | J | K | L | M | N | O | P | Q | R |
| FIRST COMPONENT | | | | | | | | | | | | | | | | | | |
| perfluorocarbon[(1)] | 95.3 | 97.5 | 76.0 | — | 68.0 | 65.0 | 65.0 | 84.0 | 88.0 | 81.5 | 64.0 | — | 90.0 | 94.0 | 90.0 | 94.0 | 65.0 | 65.0 |
| parachlorobenzo-trifluoride | — | — | 12.0 | 50.0 | 30.0 | 33.0 | 33.0 | — | 8.0 | 16.5 | 34.0 | — | 6.0 | — | — | — | 33.0 | 33.0 |
| Bromochloro-methane | — | — | — | — | — | — | — | — | — | — | — | 90.0 | — | — | — | — | — | — |
| SECOND COMPONENT | | | | | | | | | | | | | | | | | | |
| isoparaffin $C_{7-8}$ | 4.7 | 2.5 | — | — | 2.0 | — | — | — | — | 2.0 | — | 10.0 | — | — | — | — | — | — |
| isoparaffin $C_{8-9}$ | — | — | 12.0 | — | — | — | — | — | 4.0 | — | — | — | 4.0 | — | — | — | — | — |
| isoparaffin $C_{10-11}$ | — | — | — | 50.0 | — | — | — | 16.0 | — | — | — | — | — | — | — | — | — | — |

TABLE I-continued

| | Co-Solvent Compositions % Weight | | | | | | | | | | | | | | | | | |
|---|---|---|---|---|---|---|---|---|---|---|---|---|---|---|---|---|---|---|
| | A | B | C | D | E | F | G | H | I | J | K | L | M | N | O | P | Q | R |
| isoparaffin $C_{11-12}$ | — | — | — | — | — | 2.0 | — | — | — | — | — | — | — | — | — | — | — | — |
| isoparaffin $C_{11-13}$ | — | — | — | — | — | — | 2.0 | — | — | — | — | — | — | — | — | — | — | — |
| ligroin | — | — | — | — | — | — | — | — | — | — | — | — | — | 6.0 | 10.0 | — | — | — |
| isooctane | — | — | — | — | — | — | — | — | — | — | — | — | — | — | — | 6.0 | — | — |
| hexane | — | — | — | — | — | — | — | — | — | — | — | — | — | — | — | — | 2.0 | — |
| toluene | — | — | — | — | — | — | — | — | — | — | — | — | — | — | — | — | — | 2.0 |

(1) 2,3 dihydrodecafluoropentane

The above compositions were determined to be azeotropic, non-flammable and readily dissolved in each other.

EXAMPLE 2

Adhesive primer compositions were prepared in accordance with the present invention by simple mixing at room temperature of adhesive promoter components with the co-solvent carriers of the present invention.

| | % weight |
|---|---|
| Co-Solvent Composition | |
| C | 99.7 |
| Adhesive Promoter Component (Active) | |
| tridodecylamine (TDDA) | 0.3 |

The resultant adhesive primer composition exhibited azeotropic behavior and was non-flammable, i.e., exhibited no flashpoint at 200° F. The adhesive promoter was readily miscible in the co-solvent solution.

The primer composition was applied to block shear tensile shear specimens on polypropylene. Following the application of the primer composition, an alpha-cyanoacrylate adhesive marketed commercially as LOCTITE® Adhesive 414 was applied, the blocks were joined to form an adhesive joint and allowed to cure at room temperature for 24 hours prior to testing. Testing was performed in accordance with ASTM D-4501. The average bond strength was 1,784 psi. This value was the result of substrate failure, not adhesive failure.

In nearly every tensile shear test the result was substrate failure prior to failure at the bondline, indicating the adhesive strength on the tested substrate was higher than the substrate itself.

EXAMPLE 3

Adhesive primer compositions were prepared in accordance with the present invention as in Example 2, using the following components:

| | % weight |
|---|---|
| Co-Solvent Composition | |
| D | 99.6 |
| Adhesive Promoter Component (Active) | |
| tridodecylamine (TDDA) | 0.4 |

The resultant adhesive primer composition exhibited azeotropic behavior and was non-flammable, i.e., exhibited no flashpoint at 200° F.

The primer composition was applied to polypropylene block shear specimens. Following the application of the primer composition, an alpha-cyanoacrylate adhesive marketed commercially as LOCTITE® Adhesive 414 was applied, the blocks were joined to form an adhesive joint and allowed to cure at room temperature for 24 hours prior to testing. Testing was performed in accordance with ASTM D-4501.

The average bond strength for each is given below:

Average PSI

| | |
|---|---|
| polypropylene (PP) | 3562 |
| high density polyethylene (HDPE) | 1731 |
| low density polyethylene (LDPE) | 935 |

In nearly every tensile shear test the result was substrate failure prior to failure at the bondline, indicating the adhesive strength on the tested substrate was higher than the substrate itself.

EXAMPLE 4

Adhesive primer compositions were prepared in accordance with the present invention as in Example 2, using the following components:

| | % weight |
|---|---|
| Co-Solvent Compositions | |
| Q | 99.7 |
| R | 99.7 |
| Adhesive Promoter Component (Active) | |
| tridodecylamine (TDDA) | 0.3 |

The resultant adhesive primer composition exhibited azeotropic behavior and was non-flammable, i.e., exhibited no flashpoint at 200° F.

The primer composition was applied to polypropylene block tensile shear specimens as in the previous examples and tested in accordance with ASTM D-4501.

The average bond strengths for each substrate is shown below.

| | psi | |
|---|---|---|
| Substrate | Q | R |
| PP | 3705 | 3563 |

In nearly every tensile shear test the result was substrate failure prior to failure at the bondline, indicating the adhesive strength on the tested substrate was higher than the substrate itself.

EXAMPLE 5

Adhesion primer compositions were prepared in accordance with the present invention as in Example 2, using the following components:

| | % weight |
|---|---|
| Co-Solvent Compositions | |
| E | 99.6 |
| Adhesive Promoter Component (Active) | |
| trihexadecylamine (THDA) | 0.4 |

The resultant adhesive primer composition exhibited azeotropic behavior and was non-flammable, i.e., exhibited no flashpoint at 200° F.

The primer composition was applied to polypropylene and LDPE block shear specimens as in previous examples using the same adhesive and cure conditions and tested in accordance with ASTM D-4501. The average bond strength on the respective substrates was found to be:

| Substrates | psi |
|---|---|
| PP | 1326 |
| LDPE | 914 |

The lower tensile strength values using the above primer composition was believed to be attributable to the use of THDA as the active (adhesive promoter). With the exception of one test specimen on PP, the tensile failure was at the bondline.

EXAMPLE 6

Adhesive primer compositions were prepared in accordance with the present invention as in Example 2, using the following components:

| | % weight | |
|---|---|---|
| Co-Solvent Compositions | | |
| F | 98.8 | — |
| G | — | 98.8 |
| Adhesive Promoter Component (Active) | | |
| tridodecylamine (TDDA) | 1.2 | — |
| tridodecylamine (TDDA) | — | 1.2 |

The resultant adhesive primer compositions exhibited azeotropic behavior and were non-flammable, i.e., exhibited no flashpoint at 200° F. The active was readily miscible in the co-solvent composition.

The primer compositions were applied to polypropylene block shear specimens as in previous examples using the same adhesive and cure conditions and tested in accordance with ASTM D-4501. The average bond strengths are given below:

| Co-Solvent Compositions | psi |
|---|---|
| F | 2140 |
| G | 1873 |

Additional tests using co-solvent composition containing identical amounts of increasingly higher molecular weight isoparaffins showed a corresponding increase in bond strengths when other parameters, such as active agent, adhesive and preparation conditions, remained the same. For example, tensile strength averages for various other isoparaffins were as follows:

| | | psi |
|---|---|---|
| Control | (no isoparaffin) | 1482 |
| 2% $C_{7-8}$ | isoparaffin | 1622 |
| 2% $C_{8-9}$ | isoparaffin | 1774 |
| 2% $C_{9-10}$ | isoparaffin | 1985 |

EXAMPLE 7

Adhesive primer compositions were prepared in accordance with the present invention as in Example 2, using the following components:

| | % weight |
|---|---|
| Co-Solvent Compositions | |
| J | 99.8 |
| Adhesive Promoter Component (Active) | |
| hexamethydisilazane (HMDSA) | 0.2 |

The resultant adhesive primer composition exhibited azeotropic behavior and was non-flammable, i.e., exhibited no flashpoint at 200° F.

EXAMPLE 8

Adhesive primer compositions were prepared in accordance with the present invention as in Example 2, using the following components:

| | % weight |
|---|---|
| Co-Solvent Compositions | |
| L | 99.5 |
| Adhesive Promoter Component (Active) | |
| TDDA/$BF_3$ Complex | 0.5 |

The resultant adhesive primer composition exhibited azeotropic behavior and was non-flammable, i.e., exhibited no flashpoint at 200° F.

The primer composition was applied to polypropylene and LDPE block shear specimens using the same procedure and adhesive as in previous examples and tested in accordance with ASTM D-4501. The average bond strengths are shown below:

| Substrate | psi |
|---|---|
| PP | 3237 |
| LDPE | 560 |

The average bond strength value for polypropylene was for substrate failure. The value on LDPE represents bondline failure.

EXAMPLE 9

Adhesive primer compositions were prepared in accordance with the present invention as in Example 2, using the following components:

| | % weight |
|---|---|
| Co-Solvent Compositions | |
| M | 99.7 |
| Adhesive Promoter Component (Active) | |
| 1,8-diazobicyclo-undecene (DBU) | 0.3 |

The resultant adhesive primer composition exhibited azeotropic behavior and was non-flammable, i.e., exhibited no flashpoint at 200° F.

The primer composition was applied to polypropylene and high and low density polyethylene block shear specimens. The same adhesive and procedures were used as in previous examples and the specimens were tested in accordance with ASTM D-4501. The average bond strengths are shown below.

| Substrate | psi |
|---|---|
| PP | 2911 |
| HDPE | 2228 |
| LDPE | 1372 |

In nearly every tensile shear test the result was substrate failure prior to failure at the bondline, indicating the adhesive strength on the tested substrate was higher than the substrate itself.

EXAMPLE 10

Adhesive primer compositions were prepared in accordance with the present invention as in Example 2, using the following components:

| | % weight |
|---|---|
| Co-Solvent Compositions | |
| P | 95.7 |
| Adhesive Promoter Component (Active) | |
| 1,8-diazobicyclo-undecene (DBU) | 0.3 |

To co-solvent composition P was added 6% of octamethyltrisiloxane as a third co-solvent component.

The resultant adhesive primer composition exhibited azeotropic behavior and was non-flammable, i.e., exhibited no flashpoint at 200° F.

The primer composition was applied to polypropylene block shear specimens using the same adhesive and procedures as in previous examples and tested in accordance with ASTM D-4501. The average bond strength was 1139 psi.

EXAMPLE 11

Adhesive primer compositions were prepared in accordance with the present invention as in Example 2, using the following components:

| | % weight | |
|---|---|---|
| Co-Solvent Compositions | | |
| N | 99.6 | — |
| O | — | 99.6 |
| Adhesive Promoter Component (Active) | | |
| 1,8-diazobicyclorindecene (DBU) | 0.4 | 0.4 |

To co-solvent compositions N and O was added 5% and 6% respectively of a third co-solvent, octamethyltrisiloxane (OTMS).

The resultant adhesive primer composition exhibited azeotropic behavior and was non-flammable, i.e., exhibited no flashpoint at 200° F.

The primer composition was applied to polypropylene high and low density polyethylene block shear specimens. The same adhesive and preparation of test specimens was used as in other examples. The specimens were tested in accordance with ASTM D-4501. The average bond strengths are shown below:

| | psi | |
|---|---|---|
| Substrate | Comp. N | Comp. O |
| PP | 1335 | 890 |
| HDPE | 550 | 424 |
| LDPE | 818 | 527 |

The invention being thus described, it will be obvious that it may be varied in many ways. Such variations are not to be regarded as a departure from the spirit and scope of the invention, and all such modifications are intended to be included within the scope of the following claims.

What is claimed is:

1. A non-ozone depleting, non-flammable co-solvent carrier composition comprising:

(i) a halogenated first component comprising one or more perfluorocarbons in combination with one or more components selected from the group consisting of, dihydropolyfluoroalkanes having 5 to 7 carbons, trihydropolyfluoroalkanes having from 5 to 7 carbons, parachlorobenzotrifluoride, monochlorotoluene, 3,4-dichlorobenzotrifluoride, alpha, alpha, alpha-trifluorotoluene, bromochloroethane, and mixtures thereof; and (ii) an aliphatic or aromatic hydrocarbon second component having from 6 to 20 carbons present in the amount of 12% to about 60% by weight of the total composition; wherein said first and second components form a non-flammable azeotrope.

2. A composition as in claim 1 wherein said aliphatic or aromatic hydrocarbon is selected from the group consisting of isoparaffins, isooctane, ligroin, hexane, toluene and mixtures thereof.

3. A composition as in claim 1 wherein the perfluorocarbon is selected from the group consisting of perfluoromethylmorpholine, perfluoroalkanes having from 5 to 8 carbon atoms and mixtures thereof.

4. A composition as in claim 1 wherein the perfluorocarbon is $C_5F_{11}NO$ and the second component is an isoparaffin having from 6 to 20 carbons.

5. A composition as in claim 4 wherein the isoparaffin is present in amounts of about 12% to about 25% by weight of the total composition.

6. A method of forming an azeotropic non-ozone depleting adhesive promoter carrier composition comprising:

(i) providing a non-ozone depleting halogenated component comprising one or more perfluorocarbons in combination with one or more components selected from the group consisting of, dihydropolyfluoroalkanes having 5 to 7 carbons, trihydropolyfluoroalkanes having from 5 to 7 carbons, parachlorobenzotrifluoride, monochlorotoluene, 3,4-dichlorobenzotrifluoride, alpha, alpha, alpha-trifluorotoluene, bromochloroethane, and mixtures thereof; and (ii) adding to said halogenated component an aliphatic or aromatic hydrocarbon component having from 6 to 20 carbons present in the amounts of 12% to about 60% by weight of the total composition, and selected from the group consisting of isoparaffins, isooctane, ligroin, hexane, toluene and mixtures thereof; wherein the combination of (i) and (ii) forms a non-flammable azeotrope.

7. A non-ozone depleting, non-flammable co-solvent carrier composition comprising:

(i) a halogenated first compronent comprising one or more perfluorocarbons present in amounts of about 40% to about 88% by weight of the total composition in combination with one or more components selected from the group consisting of: dihydropolyfluoroalkanes having 5 to 7 carbons; trihydropolyfluoroalkanes having from 5 to 7 carbons; parachlorobenzotrifluoride; monochlorotoluene; 3,4-dichlorobenzotriflubride; alpha, alpha, alpha-trifluorotoluene; bromochloroethane; and mixtures thereof; and (ii) an aliphatic or aromatic hydrocarbon second component having from 6 to 20 carbons; wherein said first and second components form a non-flammable azeotrope.

* * * * *

UNITED STATES PATENT AND TRADEMARK OFFICE

CERTIFICATE OF CORRECTION

PATENT NO. : 6,726,760 B1
DATED : April 27, 2004
INVENTOR(S) : Fisher et al.

It is certified that error appears in the above-identified patent and that said Letters Patent is hereby corrected as shown below:

Column 18,
Line 27, should read:
-- ...a halogenated first component comprising… --.

Signed and Sealed this

Thirteenth Day of July, 2004

JON W. DUDAS
*Acting Director of the United States Patent and Trademark Office*